United States Patent
Harris et al.

(10) Patent No.: US 7,946,382 B2
(45) Date of Patent: May 24, 2011

(54) GAS COMPRESSOR WITH SIDE BRANCH ABSORBER FOR PULSATION CONTROL

(75) Inventors: Ralph E. Harris, San Antonio, TX (US);
Christine M. Scrivner, San Antonio, TX (US); Eugene L. Broerman, III, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 972 days.

(21) Appl. No.: 11/752,761

(22) Filed: May 23, 2007

(65) Prior Publication Data
US 2007/0289653 A1 Dec. 20, 2007

Related U.S. Application Data

(60) Provisional application No. 60/747,988, filed on May 23, 2006.

(51) Int. Cl.
*F01N 1/02* (2006.01)
*F01N 1/16* (2006.01)
*G10K 11/172* (2006.01)
*G10K 11/02* (2006.01)
*F01N 1/00* (2006.01)
*G10K 11/16* (2006.01)

(52) U.S. Cl. ........ 181/250; 181/273; 181/276; 181/241; 181/266; 417/312; 381/71.5

(58) Field of Classification Search ............... 181/250, 181/273, 276, 241, 266; 123/184.57; 417/312; 381/71.5, 71.1
See application file for complete search history.

(56) References Cited

U.S. PATENT DOCUMENTS

| | | | | |
|---|---|---|---|---|
| 2,919,715 | A | * | 1/1960 | Rockwell ...................... 137/549 |
| 2,973,132 | A | | 2/1961 | Hirsch |
| 3,936,606 | A | * | 2/1976 | Wanke ........................ 381/71.5 |
| 3,940,721 | A | * | 2/1976 | Kojima et al. ................ 333/233 |
| 4,523,612 | A | * | 6/1985 | Kuklo ............................ 138/30 |
| 4,779,415 | A | | 10/1988 | Richardson |
| 5,119,427 | A | | 6/1992 | Hersh et al. ..................... 381/71 |
| 5,189,266 | A | * | 2/1993 | Sasaki et al. ................... 181/227 |
| 5,377,629 | A | * | 1/1995 | Brackett et al. .......... 123/184.56 |
| 5,471,400 | A | | 11/1995 | Smalley et al. ............... 364/509 |
| 5,621,656 | A | * | 4/1997 | Langley ........................ 700/280 |
| 5,930,371 | A | * | 7/1999 | Cheng et al. ................. 381/71.5 |
| 6,295,363 | B1 | * | 9/2001 | Laak et al. .................... 381/94.1 |

(Continued)

FOREIGN PATENT DOCUMENTS

JP 2004037313 2/2004

(Continued)

OTHER PUBLICATIONS

Bedout et al., "Adaptive-Passive Noise Control With Self-Tuning Helmholtz Resonators", Journal of Sound and Vibration 202(1), pp. 109-123, 1997.

(Continued)

*Primary Examiner* — Edgardo San Martin
(74) *Attorney, Agent, or Firm* — Ann C. Livingston

(57) ABSTRACT

A method and system for reducing pulsation in lateral piping associated with a gas compressor system. A tunable side branch absorber (TSBA) is installed on the lateral piping. A pulsation sensor is placed in the lateral piping, to measure pulsation within the piping. The sensor output signals are delivered to a controller, which controls actuators that change the acoustic dimensions of the SBA.

16 Claims, 4 Drawing Sheets

U.S. PATENT DOCUMENTS

| | | | |
|---|---|---|---|
| 6,453,695 B1 | 9/2002 | Marks et al. | 62/323.1 |
| 6,533,064 B1 | 3/2003 | Kim et al. | 181/250 |
| 6,546,729 B2 | 4/2003 | Hellat et al. | 60/725 |
| 6,634,457 B2 | 10/2003 | Paschereit et al. | 181/229 |
| 6,698,390 B1 * | 3/2004 | Kostun et al. | 123/184.57 |
| 6,792,907 B1 * | 9/2004 | Kostun et al. | 123/184.57 |
| 6,799,657 B2 | 10/2004 | Daniels | 181/252 |
| 6,935,848 B2 | 8/2005 | Marshall et al. | 417/412 |
| 7,055,484 B2 | 6/2006 | Marks et al. | 123/184.57 |
| 7,299,894 B2 * | 11/2007 | Kawahashi et al. | 181/262 |
| 7,337,877 B2 * | 3/2008 | Goenka et al. | 181/250 |
| 2002/0059959 A1 * | 5/2002 | Qatu et al. | 138/30 |
| 2005/0008512 A1 | 1/2005 | McGill et al. | 417/416 |
| 2005/0194207 A1 * | 9/2005 | Nemit et al. | 181/250 |
| 2007/0101706 A1 * | 5/2007 | Harris et al. | 60/312 |
| 2008/0253900 A1 * | 10/2008 | Harris et al. | 417/53 |
| 2010/0193283 A1 * | 8/2010 | Vaz et al. | 181/229 |

FOREIGN PATENT DOCUMENTS

| | | |
|---|---|---|
| WO | 01/44681 A2 | 6/2001 |
| WO | WO 2006030559 | 3/2006 |

OTHER PUBLICATIONS

Deffenbaugh et al., "Compression Technology for the Next Generation", Technology Today, pp. 14-18, 2005.

Esteve et al., "Adaptive Helmholtz Resonators and Passive Vibration Absorbers for Cylinder Interior Noise Control", Journal of Sound and Vibration, www.sciencedirect.com, 22 pages, Oct. 12, 2007.

* cited by examiner

US 7,946,382 B2

GAS COMPRESSOR WITH SIDE BRANCH ABSORBER FOR PULSATION CONTROL

RELATED PATENT APPLICATION

This application claims the benefit of U.S. Provisional Application No. 60/747,988, filed May 23, 2006 and entitled "GAS COMPRESSOR WITH SIDE BRANCH ABSORBER FOR PULSATION CONTROL."

GOVERNMENT LICENSE RIGHTS

The U.S. Government has a paid-up license in this invention and the right in certain circumstances to require the patent owner to license others on reasonable terms as provided for by the terms of Contract No. DE-FC26-04NT-42269 for the United States Department of Energy.

TECHNICAL FIELD OF THE INVENTION

This invention relates to large compressors for transporting natural gas, and more particularly to an improved method for controlling residual pulsation in piping associated with such compressors.

BACKGROUND OF THE INVENTION

Most natural gas consumed in the United States is not produced in the areas where it is most needed. To transport gas from increasingly remote production sites to consumers, pipeline companies operate and maintain hundreds of thousands of miles of natural gas transmission lines. This gas is then sold to local distribution companies, who deliver gas to consumers using a network of more than a million miles of local distribution lines. This vast underground transmission and distribution system is capable of moving many billions of cubic feet of gas each day. To provide force to move the gas, operators install large compressors at transport stations along the pipelines.

Reciprocating gas compressors are a type of compressor that compresses gas by using a piston in a cylinder and a back-and-forth motion. A suction valve in the cylinder receives input gas, which is compressed, and discharged through a discharge valve. Reciprocating compressors inherently generate transient pulsating flows and various devices and control methods have been developed to control these pulsations. A proper pulsation control design reduces system pulsations to acceptable levels without compromising compressor performance.

A common method for pulsation control is the use of "filter bottles", also called "pulsation filters", placed between the compressor and the pipeline headers. These filters operate with surge volumes and are implemented as volume-choke-volume devices. They function as low-pass acoustic filters, and attenuate pulsations on the basis of a predetermined Helmholtz response.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As explained in the Background, filter bottles are often used to reduce compressor system pulsations. These filter bottles are placed between the compressor manifold and the system headers, on the suction or discharge side or on both sides. However, this approach to filtering is not always sufficient to reduce residual pulsations. Even after filter bottles are installed, residual pulsations can exist in the piping attached to the compressor. Failure to attenuate these pulsations can lead to vibration that can harm compressor equipment or piping or even auxiliary equipment such as cleaners.

The following description is directed to a tunable side-branch-absorber (SBA), which is connected at a critical location on the compressor system piping. The SBA addresses the pulsation-caused vibration in the piping over the entire compressor speed range with minimal pressure loss penalty.

Figure 1:
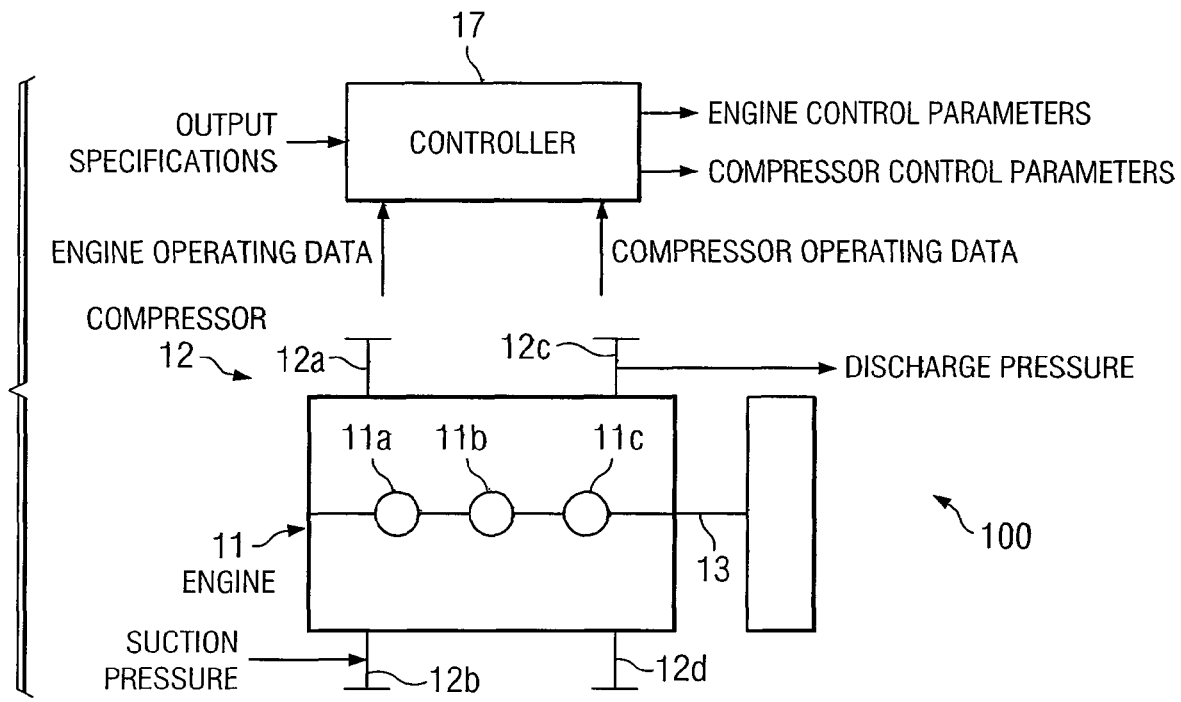
FIG. 1 illustrates an integrated (low speed) compressor system.

FIG. 1 illustrates a reciprocating gas compressor system 100. Compressor system 100 is an "integrated" compressor system in the sense that its engine 11 and compressor 12 share the same crankshaft 13. The engine 11 is represented by three engine cylinders 11a-11c. Typically, engine 11 is a two-stroke engine. The compressor 12 is represented by four compressor cylinders 12a-12d. In practice, engine 11 and compressor 12 may each have fewer or more cylinders.

Figure 2:
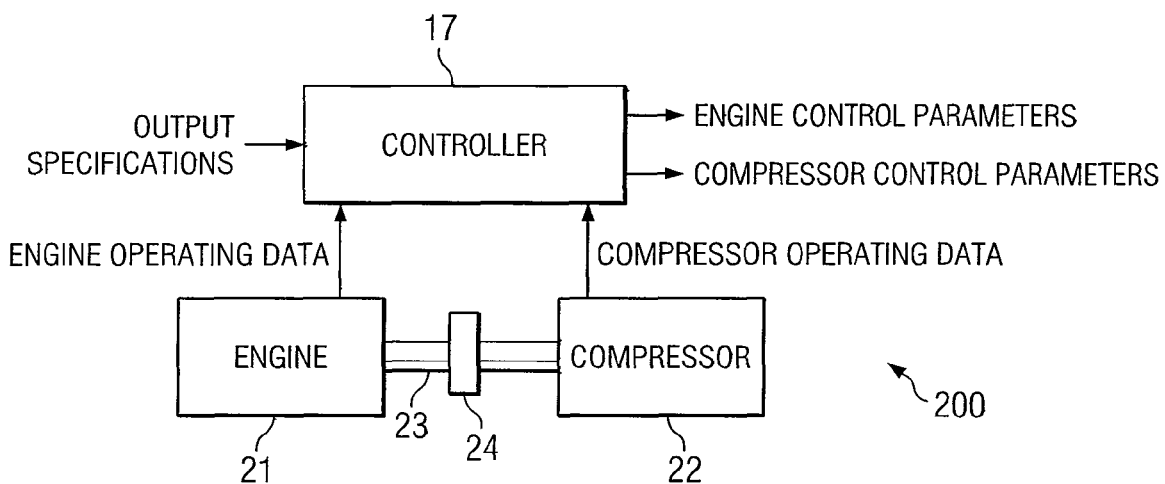
FIG. 2 illustrates a separable (high speed) compressor system.

FIG. 2 illustrates a reciprocating gas compressor system 200 in which the engine 21 and compressor 22 are separate units. This engine/compressor configuration is referred to in the natural gas industry as a "separable" compressor system. The respective crankshafts 23 of engine 21 and compressor 22 are mechanically joined at a gearbox 24, which permits engine 21 to drive the compressor 22.

As indicated in the Background, a typical application of gas compressor systems 100 and 200 is in the gas transmission industry. System 100 is sometimes referred to as a "low speed" system, whereas system 200 is sometimes referred to as a "high speed" system. The trend in the last decade is toward separable (high speed) systems, which have a smaller footprint and permit coupling to either an engine or electric motor.

Both systems 100 and 200 are characterized by having a reciprocating compressor 12 or 22, which has one or more internal combustion cylinders. Both systems have a controller 17 for control of parameters affecting compressor load and capacity. Both systems can exhibit the residual frequency problems discussed above.

Low speed (integral) compressor systems often operate in a double-acting cylinder mode, which means that the pistons compress a gas with both directions of their stroke, and have a two-bottle pulsation filter configuration. The major acoustic response (Helmholtz) frequency associated with these two-volume filter systems is often placed between the fundamental (1×) and second (2×) compressor pulsation orders. However, increased capacity control has led to increased single-acting operation, which in turn increases 1× pulsations.

Residual pulsations also occur in high speed (separable) compressor systems. Many high speed systems use a single bottle pulsation filter system, and place the filter system's Helmholtz response below 1×. However, increased demand for variable capacity has lead to single acting cylinders, which leads to an increase in 1× pulsation amplitudes.

Engines 11 and 21 are used as the compressor driver. That is, the engine's output is unloaded through the compressor. In the example of this description, engines 11 and 21 are internal combustion type engines, but the same concepts could apply to other engines or motors.

As shown in FIG. 1, the compressor system operates between two gas transmission lines. A first line, at a certain pressure, is referred to as the suction line. A second line, at a higher pressure, is referred to as the discharge line. Typically, the suction pressure and discharge pressure are measured in psi (pounds per square inch). In practical application, gas flow is related to the ratio of the suction and discharge pressures.

The following description is written in terms of the separable system 200. However, the same concepts are applicable to system 100; as indicated in FIGS. 1 and 2, the same controller 17 may be used with either type of system.

Figure 3:
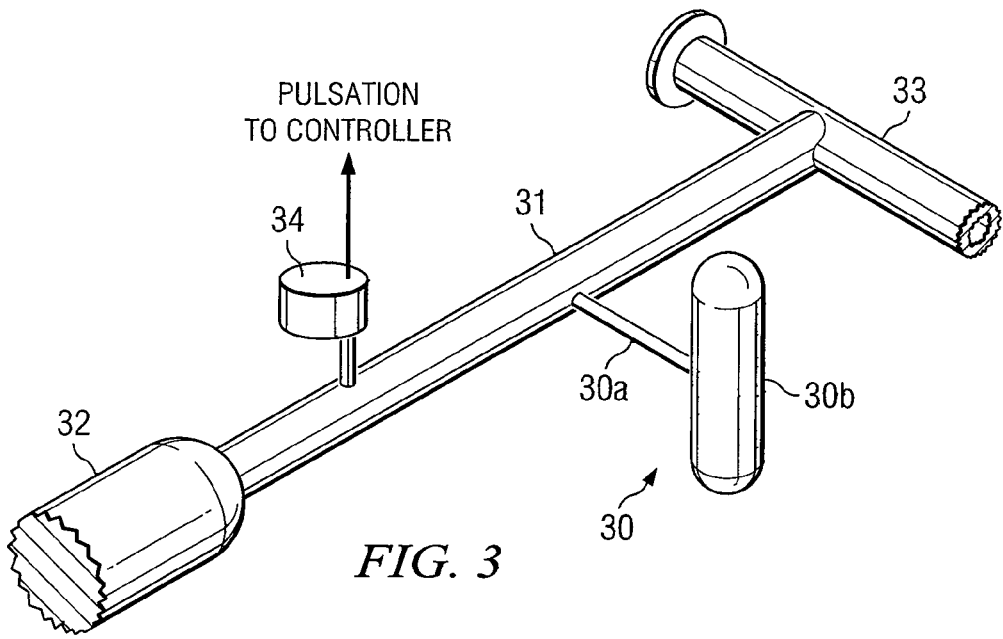
FIG. 3 illustrates a tunable side branch absorber in accordance with the invention.

FIG. 3 illustrates a tunable SBA 30 installed on piping 31 of a compressor system, between a compressor discharge bottle 32 and the discharge header 33 leading to the main pipeline. This piping between the compressor and headers is referred to as "lateral" piping.

In accordance with the invention, SBA 30 reduces residual low frequency pulsations by altering the frequency of the responses in the lateral piping. SBA 32 may be installed on lateral piping either upstream or downstream of the compressor system, that is, SBA 30 may be installed on piping between either the discharge or suction side of the compressor and the associated headers. SBA 30 may be installed on the lateral piping with or without a filter system installed in the compressor piping system.

SBA 30 comprises a choke tube 30a and surge volume 30b. Choke tube 30a is a span of piping connecting the lateral piping 31 to the surge volume 30b.

As is known in the art of side branch absorbers (also known as Helmholtz resonators) for other applications, the physical dimensions of choke tube 30a and surge volume 30b are not the same as their acoustic dimensions. The desired acoustic dimensions and the resulting physical dimensions are determined by acoustic modeling.

The acoustic dimensions of SBA 30 vary depending on the pulsation frequency to be dampened. The connecting piping 30a is attached to the lateral piping 31 at a critical location, such that pulsations corresponding to the acoustic natural frequency of the SBA 30 are absorbed from the compressor system. The diameter and size of the connecting piping 30a and the size of the surge volume 30b determine the acoustic natural frequency of the SBA.

Figure 4:
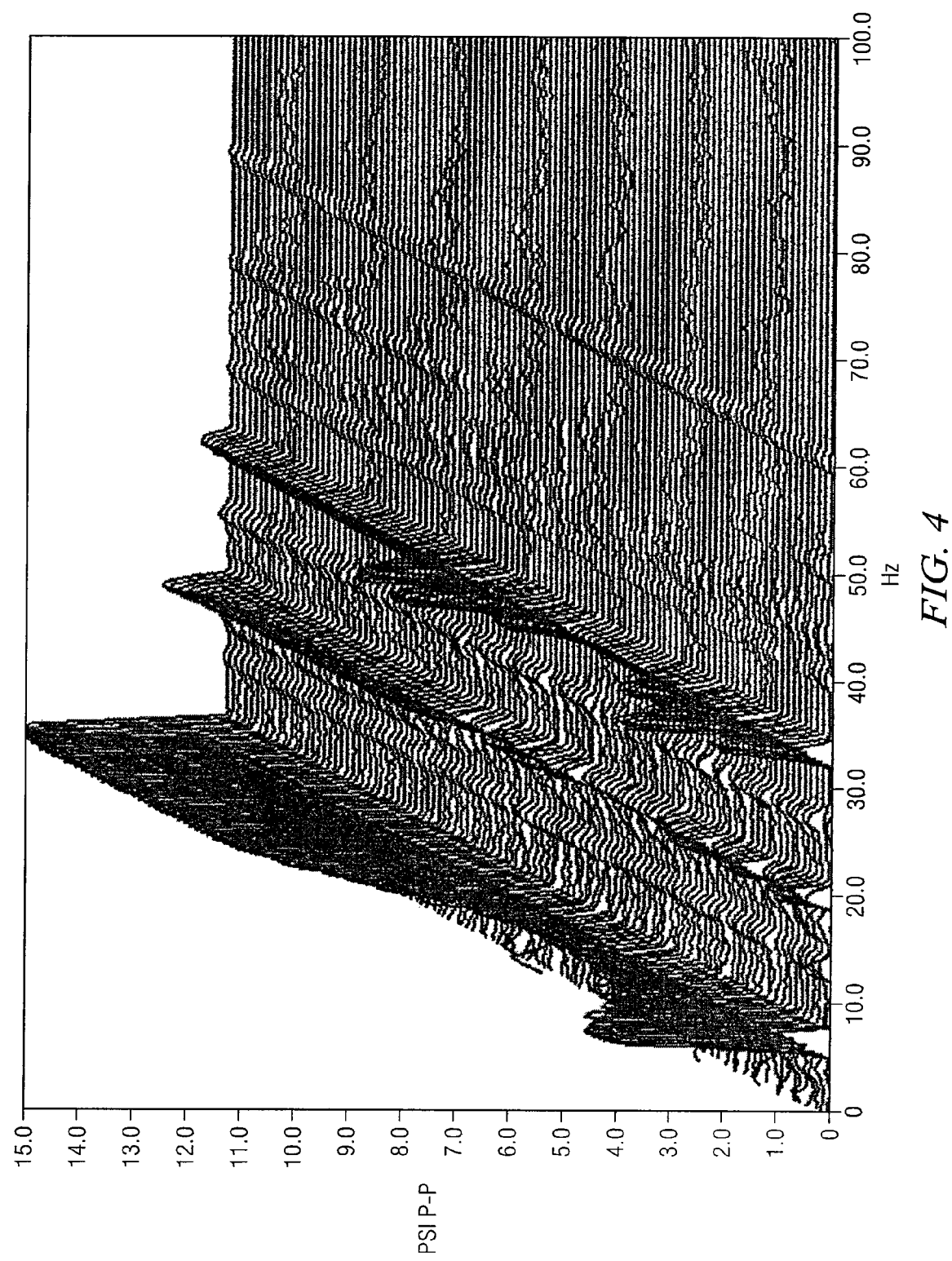
FIG. 4 illustrates the pulsation response of a compressor without pulsation control, operating at 400 rpm.
Figure 5:
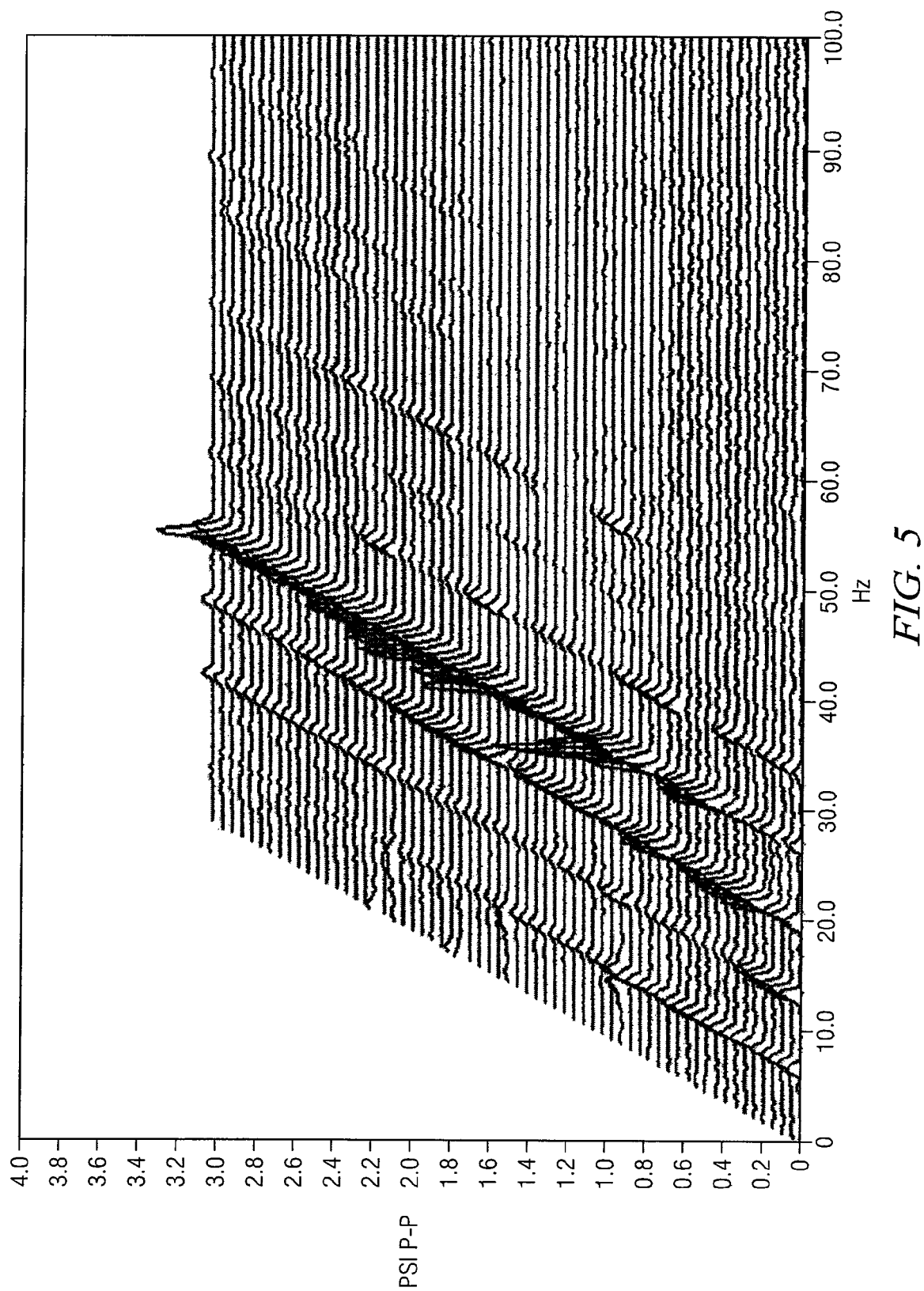
FIG. 5 illustrates pulsation control achieved by the side branch absorber of FIG. 3, to be compared to the pulsation response of FIG. 4.

FIGS. 4 and 5 illustrate how SBA 30 can be used to reduce residual 1× (fundamental) pulsations in a compressor system. FIG. 4 illustrates the dominant 1× response for a compressor operating at 400 rpm. FIG. 5 illustrates the lowered 1× pulsation after installation of SBA 30.

A major advantage of the automated, self-tuning SBA 30 as compared to a fixed volume SBA is that it is suitable for variable speed compressor systems as well as fixed speed compressor systems. For variable speed compressor systems, an automated, self-tuning SBA 30 tracks changing compressor operating conditions, and provides pulsation control optimization based on the measured operating conditions (i.e., measured pulsations and temperatures).

Referring again to FIG. 3, pulsation values, P, within the lateral piping 31 are tracked with one or more sensing devices 34. An example of a suitable sensing device 34 has a tap into the lateral piping 31 and a pressure-to-voltage transducer, which measures dynamic pressure of the flowing gas within the lateral piping 31. Data acquisition signals, representing values of P, from sensor 34 are delivered to controller 17, which determines control values, and delivers control signals to actuators that adjust the acoustic natural frequency of the self-tuning SBA 30. SBA 30 is self-tuning in the sense that programming of controller 17 causes changes in pulsations to result in changes in the acoustic natural frequency of the self-tuning SBA 30.

Various measurement devices are known for direct measurement of pulsation within piping 31. In other embodiments, it may be possible to measure vibration or to infer pulsation changes from changes in other operating conditions.

The acoustic natural frequency of SBA 30 may be adjusted by various techniques. One method of changing the natural frequency is to change the volume of the surge volume 30b. For example, surge volume 30b may comprise of a housing for inflatable bladders or some other adjustable means, which may be used to change the internal volume. Or surge volume 30b may be implemented as a cylinder and piston, with the piston's travel within the cylinder determining the internal volume.

Another method of changing the acoustic natural frequency of SBA 30 is to change the acoustic length or diameter of choke tube 30a. In general terms, the natural frequency of SBA 30 is adjusted by adjusting an SBA "acoustic dimension (s) or geometry", which may be the surge volume, choke tube length, or choke tube diameter, or a combination of these. Dimension(s) or geometry adjustments are accomplished with appropriate mechanisms, controlled by signals from controller 17.

Controller 17 is equipped with processing and memory devices, appropriate input and output devices, and an appropriate user interface. It is programmed to perform the various control tasks and deliver control parameters to the compressor system.

Controller 17 receives output specifications that specify operating parameters, such as a desired discharge pressure for the compressor system. It also receives operating data from the compressor system. This input data may be measured data from various sensors (not shown) or data from other control devices associated with the compressor system. Given appropriate input data, output specifications, and control objectives described herein, algorithms for programming controller 17 may be developed and executed.

In the examples of FIGS. 1 and 2, controller 17 controls the compressor system directly. In other embodiments, controller 17 could be remote from the compressor system, and control parameters could be delivered over a data communications link, such as a network. A networked link of this type would permit the networking of a controller 17 with a remote station control system.

Figure 6:
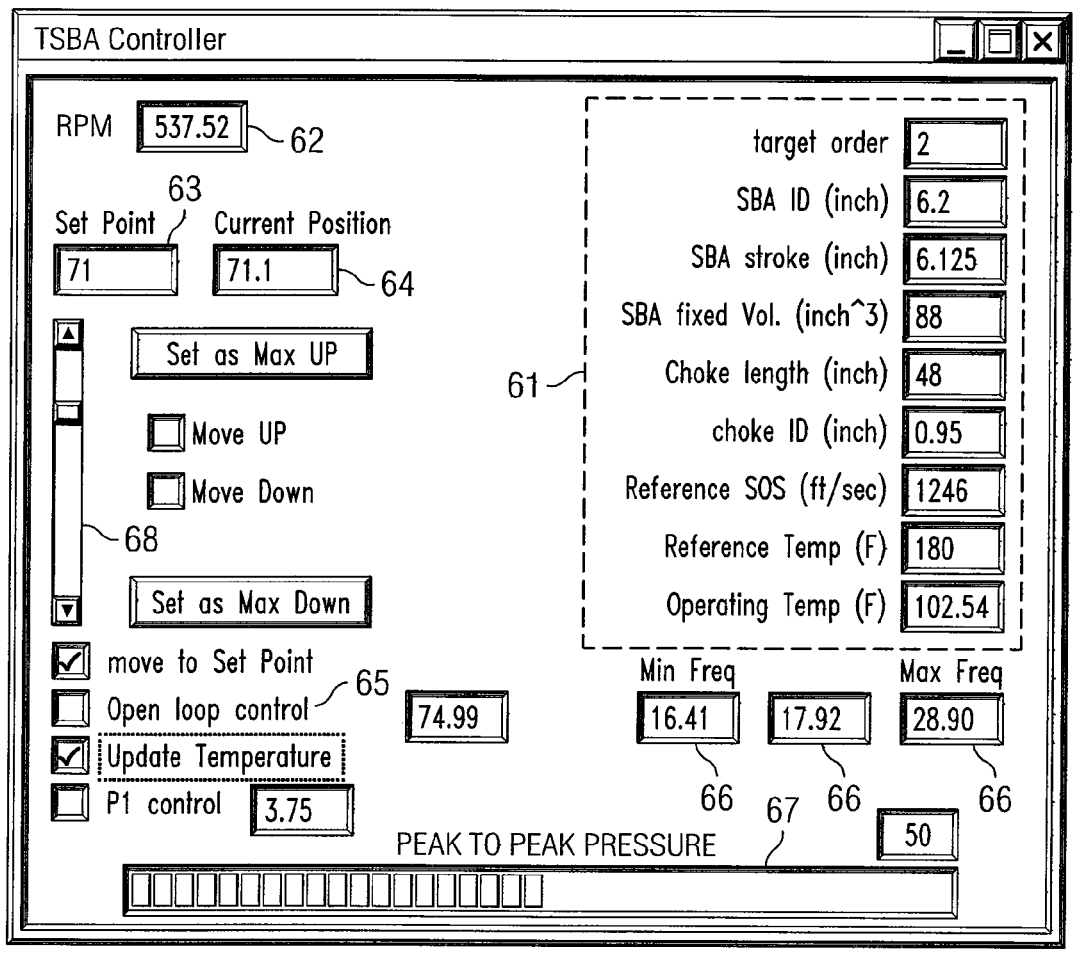
FIG. 6 illustrates a control system for the tunable side branch absorber.

FIG. 6 illustrates an example of a user interface for use with controller 17, which is programmed to display measured and calculated data, and to receive sensor and user input as illustrated. In the example of FIG. 6, the volume of the side branch absorber is a cylinder and piston, with the piston's stroke determining the volume. This acoustic dimension of the side branch absorber 30 is adjusted using control signals from controller 17 to a piston actuator. In other embodiments of side branch absorber, additional or other acoustic dimensions could be adjusted with signals to various actuators.

A set of baseline parameters 61 are inputs to controller 17. A target order represents the order of the response to be damped (i.e., 1×, 2×, etc.). The SBA inner diameter (ID), SBA stroke, SBA volume, choke length, and choke inner diameter (ID) are acoustic dimensions of the side branch absorber 30. Reference speed of sound and reference temperature values represent expected values of the speed of sound in the gas in the piping and the temperature of the gas. The foregoing values are input by an operator of controller 17. The operating temperature is a measured value.

The interface also displays the compressor speed 62 in rpm. The baseline inputs and rpm value are used to accomplish a "quick" open loop tuning of the side branch absorber 30. Once quick positioning is achieved, closed loop control is triggered, during which controller 17 receives pressure (pulsation) feedback. Alternatively, an open loop control box 65 may be checked to result in open loop control.

The set point 63 and current position 64 each represent a percent of the available volume of the side branch absorber. For example, the display shows a set point volume of 71 percent of the available volume of the side branch absorber 30 is open to the compressor piping. A slider 68 permits the set point 63 to be adjusted.

Frequency values represent measured pulsation frequencies, minimum, maximum, and current. A peak to peak pressure bar 67 displays pressure measurements that represent pulsation intensities.

What is claimed is:

1. A method of reducing pulsations in lateral piping associated with a gas compressor, the lateral piping connecting the suction or discharge side of the compressor to a suction or discharge header, comprising:
    placing a pulsation filter bottle between the compressor and the header, the pulsation filter bottle configured as a volume-choke-volume device to reduce pulsations below a predetermined frequency;
    placing a tunable side branch absorber on the lateral piping between the filter bottle and the header;
    wherein the side branch absorber has a volume housing and a choke tube;
    wherein the side branch absorber further has at least one actuator operable to change at least one of the following side branch absorber dimensions: volume, choke tube length, choke tube diameter;
    placing a pressure sensor inside the lateral piping between the compressor and the side branch absorber;
    wherein the pressure sensor is operable to measure pulsations within the lateral piping by measuring pressure of gas flowing within the piping;
    providing a user interface that displays at least the engine speed of the compressor and the frequency of the pulsations, and that receives frequency order input representing at least an order of pulsation frequency to be reduced;
    during a quick positioning phase, using a controller to receive rpm values representing the engine speed of the compressor, to determine an open loop actuator control value based at least in part on the rpm values, and to deliver a signal representing the open loop control value to the actuator;
    subsequent to the quick positioning phase, using a controller to receive signals from the pressure sensor, to determine current frequency values, a fundamental pulsation frequency order (1×) and at least one pulsation frequency order (2× or greater) based on the signals from the pressure sensor; to determine a closed loop actuator control value based at least in part on the frequency values and operator frequency order input, and to deliver a signal representing the closed loop actuator control value to the side branch absorber; and
    wherein the open loop actuator control value and the closed loop actuator control value each represent an amount to change a dimension of the side branch absorber.

2. The method of claim 1, wherein the volume housing is a cylinder and the actuator moves a piston within the cylinder to change the volume of the side branch absorber.

3. The method of claim 1, wherein the actuator inflates or deflates a bladder to change the volume of the side branch absorber.

4. The method of claim 1, wherein the controller determines the actuator control value in response to measured pulsations within the piping.

5. The method of claim 4, wherein the pulsations are measured with a pressure transducer.

6. The method of claim 1, wherein the controller determines the actuator control value partially based on measured temperature of gas within the piping.

7. The method of claim 1, wherein the controller implements a closed loop control method.

8. The method of claim 1, wherein the controller implements an open loop control method, with at least one dimension specified by an operator.

9. A side branch controller for reducing pulsations in lateral piping associated with a gas compressor, the lateral piping connecting the suction or discharge side of the compressor to a suction or discharge header, comprising:
    a volume housing;
    a choke tube for open attachment to the piping;
    wherein the side branch absorber further has at least one actuator operable to change at least one of the following side branch absorber dimensions: volume, choke tube length, choke tube diameter;
    a pressure sensor inside the lateral piping between the compressor and the side branch absorber; wherein the pressure sensor is operable to measure pulsations within the lateral piping by measuring pressure of gas flowing within the piping;
    a user interface that displays at least the engine speed of the compressor and the frequency of the pulsations, and receives frequency order input representing at least an order of pulsation frequency to be reduced;
    a controller, configured to perform the following tasks during a quick positioning phase: to receive rpm values representing the engine speed of the compressor, to determine an open loop actuator control value based at least in part on the rpm values, and to deliver a signal representing the open loop control value to the actuator;
    the controller further configured to perform the following tasks subsequent to the quick positioning phase: to receive signals from the pressure sensor, to determine current frequency values, a fundamental pulsation frequency order (1×) and at least one pulsation frequency order (2× or greater) based on the signals from the pressure sensor; to determine a closed loop actuator control value based at least in part on the frequency values and operator frequency order input, and to deliver a signal representing the closed loop actuator control value to the side branch absorber; and
    wherein the open loop actuator control value and the closed loop actuator control value each represent an amount to change a dimension of the side branch absorber.

10. The side branch absorber of claim 9, wherein the volume housing is a cylinder and the actuator moves a piston within the cylinder to change the volume of the side branch absorber.

11. The side branch absorber of claim 9, wherein the actuator inflates or deflates a bladder to change the volume of the side branch absorber.

12. The side branch absorber of claim 9, wherein the controller determines the actuator control value in response to measured pulsations within the piping.

13. The side branch absorber of claim 12, wherein the pulsations are measured with a pressure transducer.

14. The side branch absorber of claim 9, wherein the controller determines the actuator control value partially based on measured temperature of gas within the piping.

15. The side branch absorber of claim 9, wherein the controller implements a closed loop control method.

16. The side branch absorber of claim 9, wherein the controller implements an open loop control method, with at least one dimension specified by an operator.

* * * * *